(12) United States Patent
Pons et al.

(10) Patent No.: US 9,834,124 B2
(45) Date of Patent: Dec. 5, 2017

(54) WHEELED VEHICLE FOR TRANSFERRING HEAVY LOADS, HAVING A PLURALITY OF LOW-HEIGHT ARTICULATED MODULES

(71) Applicant: Agence Nationale Pour la Gestion des Déchets Radioactifs, Chatenay-Malabry (FR)

(72) Inventors: Damien Pons, Paris (FR); Jean-François Herve, Sèvres (FR); Rudy Southway, Montlhéry (FR); François-Sylvain Crosnier, Voisins le Bretonneux (FR)

(73) Assignee: AGENCE NATIONALE POUR LA GESTION DES DÉCHETS RADIOACTIFS, Chatenay-Malabry (FR)

( * ) Notice: Subject to any disclaimer, the term of this patent is extended or adjusted under 35 U.S.C. 154(b) by 0 days.

(21) Appl. No.: 14/906,389

(22) PCT Filed: Jul. 22, 2014

(86) PCT No.: PCT/EP2014/065693
§ 371 (c)(1),
(2) Date: Jan. 20, 2016

(87) PCT Pub. No.: WO2015/011125
PCT Pub. Date: Jan. 29, 2015

(65) Prior Publication Data
US 2016/0159263 A1   Jun. 9, 2016

(30) Foreign Application Priority Data
Jul. 24, 2013 (FR) ...................... 13 57309

(51) Int. Cl.
*B60P 1/02* (2006.01)
*B60P 1/64* (2006.01)
*B62D 53/00* (2006.01)

(52) U.S. Cl.
CPC ............... *B60P 1/02* (2013.01); *B60P 1/6445* (2013.01); *B62D 53/00* (2013.01)

(58) Field of Classification Search
CPC ......... B62D 53/005; B60P 1/02; B60P 1/6445
(Continued)

(56) References Cited

U.S. PATENT DOCUMENTS 3,099,460 A * 7/1963 Sheehan ................ B62D 7/144
                                                        180/23
3,183,991 A * 5/1965 Gamaunt ............. B60K 17/358
                                                        180/24

(Continued)

FOREIGN PATENT DOCUMENTS

| CN | 102745243 A | 10/2012 |
|---|---|---|
| DE | 10 2005 048 455 A1 | 4/2007 |
| WO | 81/02554 A1 | 9/1981 |

OTHER PUBLICATIONS

International Search Report issued in Application No. PCT/EP2014/065693 dated Nov. 4, 2014.
(Continued)

*Primary Examiner* — Kaitlin Joerger
(74) *Attorney, Agent, or Firm* — Pearne & Gordon, LLP (57) ABSTRACT

The wheeled vehicle enables heavy loads that are mounted on low-height legs to be lifted and transported. Indeed, it is provided with a plurality of wheeled modules (6, 7, 19) that are articulated to each other and have large-diameter wheels. The means for raising the load are centrally placed relative to the longitudinal axis of the wheeled modules. The raising thereof by central jacks makes it possible to lift the load (3) and the loading platform (20) thereof, the ends of which rest
(Continued)

on each of the end wheeled modules (46, 47) by way of articulated jacks that control the height of the loading platform (20). Application to the transfer of hoods for waste containers to be stored.

13 Claims, 5 Drawing Sheets

(58) Field of Classification Search
USPC .............. 414/495, 498; 180/14, 14.1, 14.2; 280/400, 404, 411.1, 419
See application file for complete search history.

(56) References Cited

U.S. PATENT DOCUMENTS

| | | | | |
|---|---|---|---|---|
| 3,246,714 A * | 4/1966 | Middlesworth | ........ | B62D 13/00 180/14.1 |
| 3,370,551 A * | 2/1968 | Shannon | ........ | B60F 1/046 104/306 |
| 3,497,092 A * | 2/1970 | McIntyre | ........ | B60P 1/6445 414/495 |
| 3,550,802 A * | 12/1970 | Ellerd | ........ | B62D 13/00 280/408 |
| 3,612,312 A * | 10/1971 | Behrmann | ........ | B60K 1/02 414/495 |
| 4,060,145 A * | 11/1977 | Kingman | ........ | B60G 5/04 280/423.1 |
| 4,061,353 A * | 12/1977 | Kingman | ........ | B62D 53/062 280/423.1 |
| 4,441,730 A * | 4/1984 | Damm | ........ | B62D 13/04 280/426 |
| 4,823,896 A * | 4/1989 | Evans | ........ | B60B 11/00 180/24.01 |
| 4,840,533 A * | 6/1989 | Althoff | ........ | B66F 7/18 248/182.1 |
| 4,854,805 A * | 8/1989 | Althoff | ........ | B65G 41/008 254/89 H |
| 5,301,787 A * | 4/1994 | Etherington | ........ | B62D 53/005 198/303 |
| 5,700,023 A * | 12/1997 | Picard | ........ | B62D 53/005 280/411.1 |
| 6,170,848 B1 * | 1/2001 | Wechner | ........ | B62D 12/00 180/418 |
| 6,481,521 B2 * | 11/2002 | Sugiyama | ........ | B61B 10/04 180/168 |
| 6,796,572 B1 * | 9/2004 | McGhie | ........ | B62D 13/00 280/426 |
| 7,137,641 B1 * | 11/2006 | Lipsey, III | ........ | B62D 13/02 280/408 |
| 8,425,174 B2 * | 4/2013 | Quirion | ........ | B64F 1/32 248/371 |
| 8,465,244 B2 * | 6/2013 | Lanigan, Sr. | ........ | B65G 63/065 414/391 |
| 8,919,476 B2 * | 12/2014 | Holland | ........ | B62D 1/00 180/167 |
| 2005/0230934 A1 * | 10/2005 | Wilt | ........ | B60P 1/00 280/400 |
| 2011/0265274 A1 * | 11/2011 | Liu | ........ | E01D 21/00 14/77.1 |
| 2015/0071748 A1 * | 3/2015 | Dyke | ........ | B60P 3/40 414/495 |

OTHER PUBLICATIONS

Written Opinion issued in Application No. PCT/EP2014/065693 dated Nov. 4, 2014.

\* cited by examiner

WHEELED VEHICLE FOR TRANSFERRING HEAVY LOADS, HAVING A PLURALITY OF LOW-HEIGHT ARTICULATED MODULES

FIELD OF THE INVENTION

The present invention relates to a vehicle architecture particularly suited to the transport of heavy loads of high average density, for example to the transport of packages of radioactive waste, especially inside horizontal or steeply tilted underground galleries.

PRIOR ART AND PROBLEM TO BE SOLVED

Nuclear power plants for producing electrical energy generate waste, some of which have a medium or high radiological activity, and/or a long life. This waste is packed into packages and enclosed in high-weight containers because of the radiation shield surrounding the packages. Such a container, often referred to as a "hood" commonly represents a weight in the order of one hundred thirty thousand (130,000) kilograms.

These hoods frequently have a parallelepiped shape and are fitted with legs intended to facilitate their installation on a transport vehicle and their removal from this vehicle. This is especially the case of hoods for transporting medium activity and long life waste produced by French power plants for producing electrical energy. The space delimited under the hood by the height of the legs is generally in the order of one (1) meter. A larger space will result in raising the roof of underground galleries, therefore in increasing the cost of the infrastructure, and a smaller space will make it difficult to manufacture transport vehicles or trailers able to pass under the hood between the legs.

Transferring these hoods, to store them in the underground galleries, supposes a horizontal transfer at the surface, then going down at the bottom, and finally a horizontal transfer at the bottom, with the reverse path for the container emptied of its waste.

Going down at the bottom can be made through several means the main types of which are an elevator, a railway (funicular, rack train, etc.) traveling on rails in a railway tunnel, or a vehicle fitted with wheels traveling in a road tunnel.

Each of these modes has advantages and drawbacks. However, the solution of the vehicle traveling in a road tunnel has numerous advantages which are as follows:

the road tunnel can be accessed by various vehicles other than the one which transports the packages, and can especially provide an access to rescue and maintenance vehicles.

The vehicle which takes the tunnel can provide, without a break of load, the displacements of hoods at the surface and into the galleries at the bottom, thus elimination sensitive loading and unloading operations with expensive infrastructures.

A disabled or damaged vehicle can more easily be removed from the gallery than a funicular-type vehicle and therefore be repaired without a long interruption of the hood transfer operations.

Figure 1:
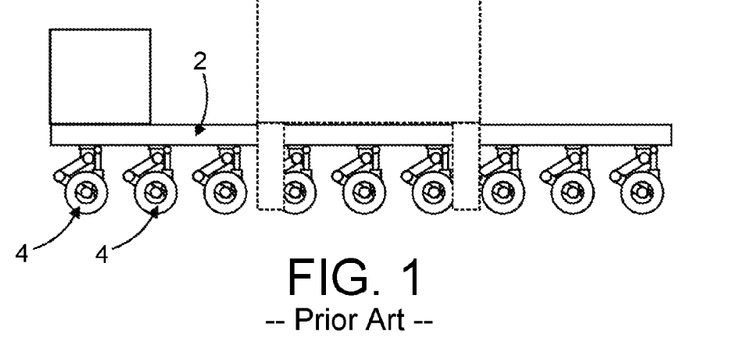
FIG. 1, in a side view, an exemplary wheeled vehicle of prior art.

The vehicles suggested for this type of mission, such as the one described in patent document DE 102005048455, are generally based on the system of live skids used in the industry to carry heavy loads, as can be seen in FIG. 1.

This type of vehicle comprises a structure 2 installed on an assembly of several rows of bogie-type running gears each including two wheels 4 placed on either side of a suspension strut. These bogies include an arm in two articulated parts allowing the vertical suspension, and a pivot with an axis substantially perpendicular to the ground allowing the steering of the whole bogie. This widespread assembly generally comes with a transmission of the hydraulic type with a hydraulic motor placed on each wheel. Each of these gears is steering and the whole vehicle can then be steered by directing all the gears in the desired direction.

The suspension of these bogies is provided by jacks, generally of the oleopneumatic type, which enable the suspension to be collapsed so as to engage the rear of the vehicle under the hood, and then to be lifted to load the hood; and the opposite to unload it.

The space between the loading platform and the ground being occupied by the bogie-type running gears and the steering sweep thereof, the set formed by the motor, the transmission and its accessories is gathered to form a cabin-shaped compartment at the front or the rear of the vehicle. This cabin, whether it includes an operator's position, significantly protrudes from the platform. This arrangement appears in FIG. 1 of patent document CN 102745243 and on the numerous vehicles including a very large number of axles such as those for example manufactured by brands such as NICOLAS® or COMETTO®.

Transmission of power to the bogie wheels is generally provided by a hydraulic transmission, with one or two hydraulic motors per bogie. This solution is very critical for underground applications due to the great amounts of hydraulic fluid, to the very large number of hoses, connections and to the general complexity of the power hydraulic circuit which can result in leaks and fires and hinder reliability and availability.

For bogie gears, replacing the hydraulic transmission by an electric transmission is under development and is announced. This evolution will eliminate the above-cited drawbacks which are critical for all the underground applications.

However, for the application to the displacement of nuclear waste hoods, major drawbacks remain for this type of vehicle architecture; they are as follows.

Bogie-type wheel gears are inserted under the platform, and fastened by the vertical pivot axis enabling steering. It results in a minimum height of the platform which adds up to a minimum the diameter of the wheel and the thickness of the platform structure. This means that the diameter of the wheels is significantly lower than the height of the loading platform. Therefore, the transport of a very heavy load such as a hood can only be made with a large number of wheels, and therefore of bogies.

The presence of a steering for each bogie results in a high number of high steerings, therefore to a high number of controls, hoses, jacks, connections. This includes a corresponding risk of failures, with a potential flow of hydraulic fluid. Only one damaged steering can create a problem requiring an intervention.

The presence of a large number of bogie-type wheel gears to carry the load results in a high-length platform since the width is calibrated by the spacing between the legs of the hood and by the width of the gallery.

Loading or unloading the hood on the platform can only be made from the rear, since the front of the vehicle includes a protrusion accommodating the motor, transmission and accessories thereof. This impossibility includes limitations, especially for clearing a disabled vehicle which can only be removed by the side of the cabin, which may not be the same side by which the access of a recovery vehicle can be made. This drawback can require a space or loop in the gallery for the infrastructure, enabling the vehicle to make a U-turn.

Placing the motor and its accessories in front or rear overhang is technically considerable, but this lengthening of the overhang then results in an increased length of the vehicle and in an overall dimension within curves which can be detrimental in a gallery.

The small diameter of wheels required by the bogie architecture and by the platform height results, even by multiplying bogies, in using tires at a load ratio too close to the allowed maximum, and thus in detecting very quick wear and tear prejudicial to the availability of vehicles.

The small diameter of wheels required by the bogie architecture and by the platform height prevents the installation in the wheels or near the wheels of heavy truck-type dry disk and air brakes. The chosen assembly is generally the oil bath multidisc brakes, with the associated drawbacks thereof in terms of risk of fire.

For these vehicles, the declivity of the gallery is relatively limited.

The purpose of the architecture according to the present invention is to overcome all these drawbacks and to add additional advantages which are particularly interesting for transporting packages of radioactive waste inside underground galleries.

SUMMARY OF THE INVENTION

For this purpose, when considering the logic of re-using bogie gears of vehicles for handling heavy loads at the surface, the one-box vehicle was given up since it is ill-fitted for the curves and brakes of slope in galleries.

The reasons leading to this architecture object of the present invention are:

the largest wheels possible are necessary, therefore with a diameter close to the available height under the hood. This ensures safety and reduces wear and tear of tires by not stressing them too close to their maximum allowed load. Therefore, the top of the tires must be very close to the bottom of the hood.

The total weight carried by the tires is the weight of the hood, about one hundred and thirty thousand kg (130,000) added to that of the vehicle itself, about fifty thousand kg (50,000). Anyway, the number of tires will be high, which will result in a long vehicle: therefore the vehicle must be articulated to be well-fitted in the galleries.

Indeed, the main object of the invention is a wheeled vehicle for transferring heavy loads mounted on legs, at a determined height H1, this vehicle comprising:

at least two distinct wheeled modules; and means for transferring the load weight on the at least two wheeled modules.

According to the invention:

the at least two wheeled modules are directly articulated to each other;

the at least two wheeled modules each have at least three wheel axles the diameter D of which is slightly lower than the determined height H1, at which the heavy loads are mounted on legs;

the vehicle has a determined minimum height $H_2$, lower than the determined height H1, at which the heavy loads are mounted on legs, to be able to grasp and lift the load, by passing under, and means for raising the load.

In a first embodiment of the vehicle according to the invention, the latter includes two wheeled modules, each fitted with a device for fastening the load, each fastening device having a degree of rotational freedom around the vertical axis, and one of both fastening devices having a degree of longitudinal translational freedom.

In this first embodiment, the vehicle preferably has a hinge around a vertical axis, between both wheeled modules, and the axle of each wheeled module being closest to the hinge is a non-steering axle, whereas the wheels of the other axles are steeringly articulated.

In the second preferential embodiment of the invention, the vehicle has three wheeled modules, and:

a central wheeled module, having four fastening devices, which receive and block the load longitudinally and transversely; and two hinges connect the central wheeled module to each of both other modules, referred to as end modules, with only one degree of rotational freedom relative to the vertical axis being provided to allow part of the weight of the heavy load to be transmitted to both end modules.

In a third embodiment of the invention, the vehicle still has three wheeled modules, and a platform is provided to receive the load and rests on the three wheeled modules;

the central module has a transverse rotation support assembly blocking the platform against roll and yaw; and both end wheeled modules have a support hinge of the platform by way of a jack, fastened to the platform and to a frame of the corresponding wheeled module by two hinges which are vertically translationally adjustable.

In this case, a pressure accumulator is used, supplied by a hydraulic power pack.

In this third embodiment, the jack used in articulating the end wheeled modules is of the oleopneumatic type.

In these second and third embodiments, it is provided that:

the central wheeled module has three axles of non-steering wheels;

both end wheeled modules have three axles of wheels, the axle of wheels of which closest to the hinge which has non-steering wheels, whereas both other axles, farthest from the hinge, have steering wheels.

In the latter case, the axles with non-steering wheels preferably have dual wheels.

In this third version, the support assembly of the central wheel module is preferably mounted on two jacks for loading and removing the load.

The support assembly of the central wheeled module can also be mounted on two rock levers, themselves mounted on the frame of the central module and actuated by a jack, itself fastened on the frame of this central wheeled module.

Finally, in order to facilitate its guiding, the vehicle has lateral guiding means in the form of horizontal wheels laterally placed at the ends and at the bottom part of the vehicle, to contact a bottom part of a gallery in which the vehicle travels.

LIST OF FIGURES

The invention and its different features will be better understood upon reading the following description, along with several figures, respectively representing.

DETAILED DESCRIPTION OF SEVERAL EMBODIMENTS OF THE INVENTION

Figure 2A:
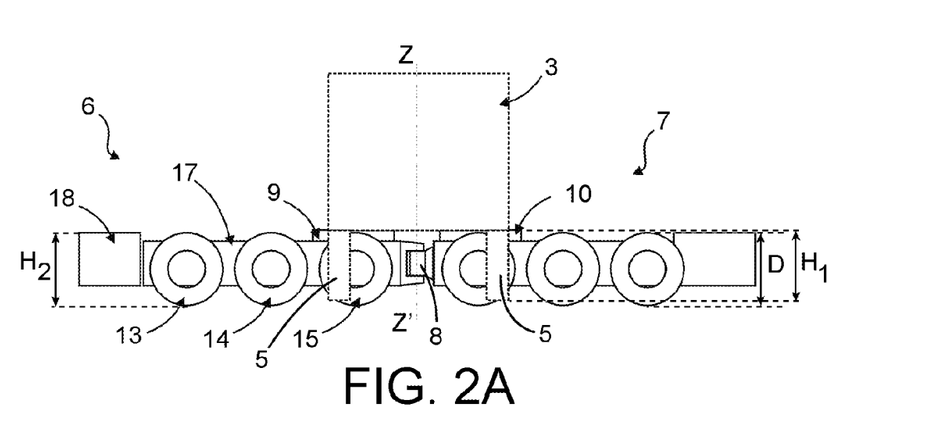
FIGS. 2A and 2B, diagrams related to a first embodiment of the wheeled vehicle according to the invention.

FIG. 2A represents, in a side view, a first embodiment of the wheeled vehicle according to the invention, including two wheeled modules 6 and 7, coupled to each other by a hinge 8, which frees a degree of freedom through the rotational movement of both these wheeled modules 6 and 7 around a vertical axis ZZ of the hinge 8.

The heavy load, namely a hood 3, with legs 5 is placed astride both wheeled modules 6 and 7, and in particular on respective fastening devices 9 and 10 of the wheeled modules 6 and 7. The wheeled modules 6 and 7 are mainly comprised of a frame 17 and three wheel axles 13, 14 and 15. Finally, overhanging at the end of each of the wheeled modules 6 and 7 is a usable space 18 to place therein the different auxiliary devices, inherent in the operation of each of the wheeled modules 6 and 7.

In this FIG. 2A is represented the height H1 of the legs 5 of the hood 3, the diameter D of the wheels of the wheeled vehicle is the minimum height H2 of this same wheeled vehicle at a low position. For all the embodiments according to the invention, the latter is lower than the height H1 of the legs 5 so that the wheeled vehicle according to the invention can pass under the hood 3 before grasping it by lifting its central part by a jack system explained below. Consequently, the diameter D of the wheels of the wheeled vehicle must be equal to or lower than the minimum height H2 of the wheeled vehicle and therefore the height of the legs 5 of the hood 3.

Figure 2B:
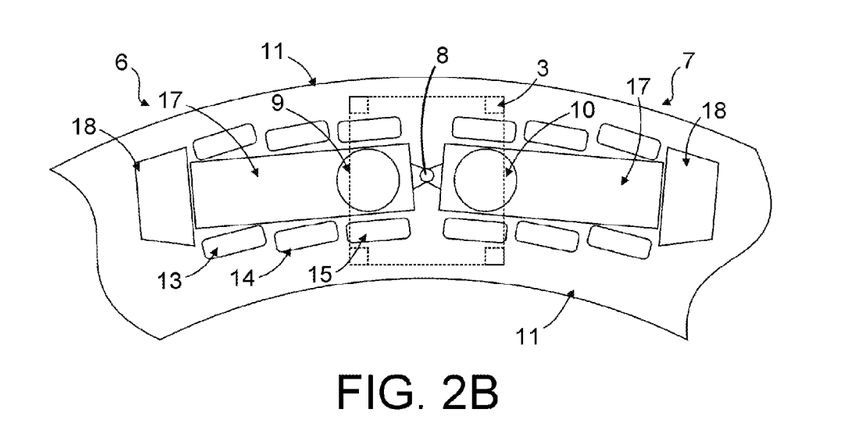

FIG. 2B shows this same first embodiment of the wheeled vehicle according to the invention, when turning, both wheeled modules 6 and 7 being tilted relative to each other. It is noticed that the wheels 13 and 14 of both axles, farthest from the hinge 8, are fitted with steering wheels, whereas the axle closest to the hinge 8 has wheels 15 which are non-steerable. Moreover, both these wheeled modules 6 and 7 are represented with three axles each having two single wheels. The invention can also be embodied with wheeled modules having a different number of axles, or having dual wheels, instead of single wheels, or even a combination between axles with single wheels and axles with dual wheels. Similarly, it is possible to use different types of tires according to the axles.

The hood 3 is connected to the wheeled module 6, on the left side of FIG. 2B, by a fastening device 9, which blocks or limits the movements of the hood 3, in the longitudinal and transverse axes and also blocks the rotation, of the roll and yaw type. In other words, the fastening device 9 frees the hood 3 in a single rotational movement around a vertical axis. The vertical translation movement of the hood 3 on its fastening device 9 of the wheeled module 6, placed on the left, is limited by the weight of the hood 3, which rests on this fastening device 9. This same hood 3 is connected to the fastening device 10 of the other wheel module 7 placed on the right side of FIG. 2B, in the same way, but with an additional freedom of longitudinal movement.

It will be noticed that among both these wheeled modules 6 and 7, there is an available space 17, in which the motor and transmission components which are necessary for both these wheeled modules 6 and 7 can be placed.

Finally, in this FIG. 2B, the lower parts 11 of the walls of the gallery are schematized, in which the wheeled vehicle according to the invention travels. It is therefore noticed the interest in using two articulated modules 6 and 7 for the same wheeled vehicle.

Figure 3:
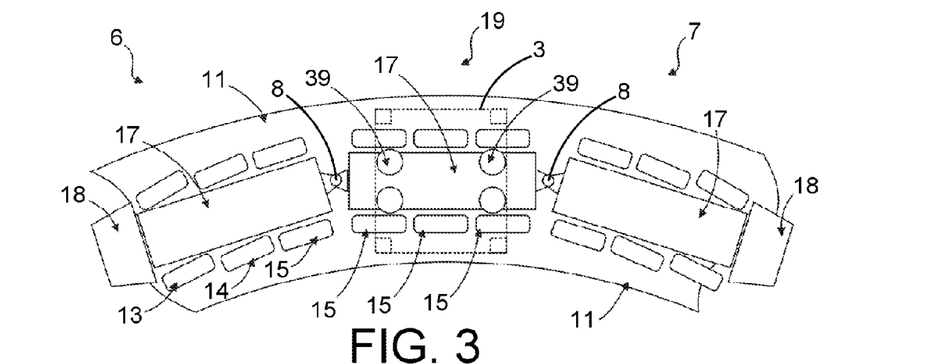
FIG. 3, a top view diagram of a second embodiment of the wheeled vehicle according to the invention.

FIG. 3 shows a second embodiment using three wheeled modules, two end wheeled modules 6 and 7 and a central wheeled module 19. In this FIG. 3, the axles have been represented with single wheels, but can be fitted with dual wheels. In this embodiment, the hood 3 is placed on the central wheeled module 19. A particular feature of this second embodiment is the transfer of part of the weight of the hood 3 to the end wheeled modules 6 and 7, by means of hinges 8, which have only one degree of freedom, in this case the freedom of rotation around the vertical axis. In other words, the end modules 6 and 7 are vertically translationally blocked, relative to the central module 19. This enables the latter to transmit part of the weight of the hood 3 which it supports to the end wheeled modules 6 and 7.

The hood 3 is then fastened to the central module, by means of four fastening devices 39, which block the movements of the hood 3, in the longitudinal and transverse axes. The four central fasteners 39 of the central wheeled module 19 include these jacks, not shown, placed vertically and form the means for raising the load, in this case the hood 3.

In this embodiment with three modules, it is possible, as shown in FIG. 3, to limit the steering axles to both end modules 6 and 7 by their steering wheels 13 and 14. The central module 19 is then fitted with non-steering wheels 15.

Figure 4A:
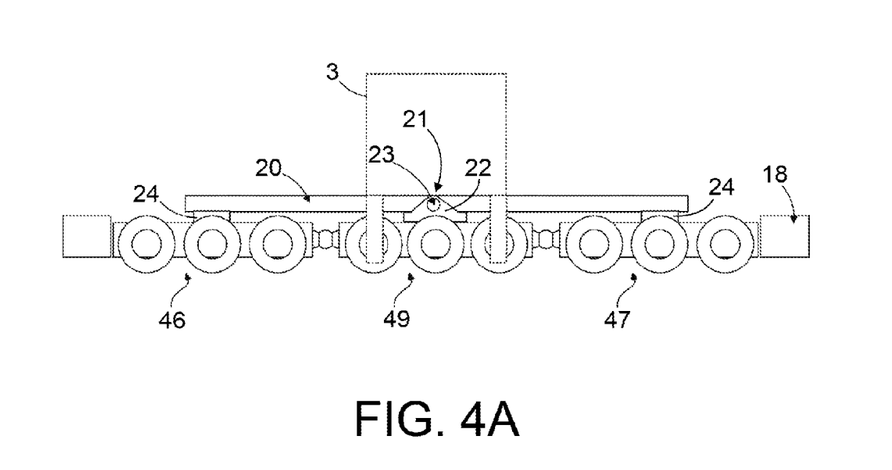
FIGS. 4A, 4B, 4C, diagrams related to a third embodiment of the wheeled vehicle according to the invention.

FIG. 4A laterally shows a second embodiment of the wheeled vehicle according to the invention with three wheeled modules, namely two end wheeled modules 46 and 47 and a central wheeled module 19. The main feature of this embodiment is that the load distribution of the hood 3, between the three wheeled modules 46, 47 and 49, is performed by a loading platform 20. The latter is connected to the central module 49 by a support assembly 21, which vertically translationally blocks or limits the movements of the hood 3, but enables its oscillation around a horizontal transverse axis 23. This connecting assembly 21 can, as shown in FIG. 4A, be made by a transverse horizontal pivot 23, and held by two side seals 22. It is however possible to obtain the same function through different technical solutions, using for example slides and rollers.

To transfer part of the load of the hood 3 to the end wheeled modules 46 and 47, each of the latter is connected to the loading platform 20, by a connection only handling the vertical translation movement. The vertical strain of the platform 20, on each of both end modules 46 and 47, is adjusted as a function of the number of wheels and tires present on each of the three wheeled modules 46, 47 and 49. In this third embodiment, it is provided that the three wheeled modules all have the same number of identical tires and that the load distribution is distributed so as to approximate one third of the total load for each of these three wheeled modules 46, 47 and 49. To obtain such a distribution, the support hinges 24, between these end modules 46 and 47 and the loading platform 20, make it possible to exert a strain substantially corresponding to one third of the total load, represented by the wheeled vehicle and the hood 3 which it transports. Numerous technological solutions to exert this strain can be used. Hydraulic jacks, hydraulic cushions, electric jacks, adjustable springs and combinations of these systems can be mentioned.

Figure 4B:
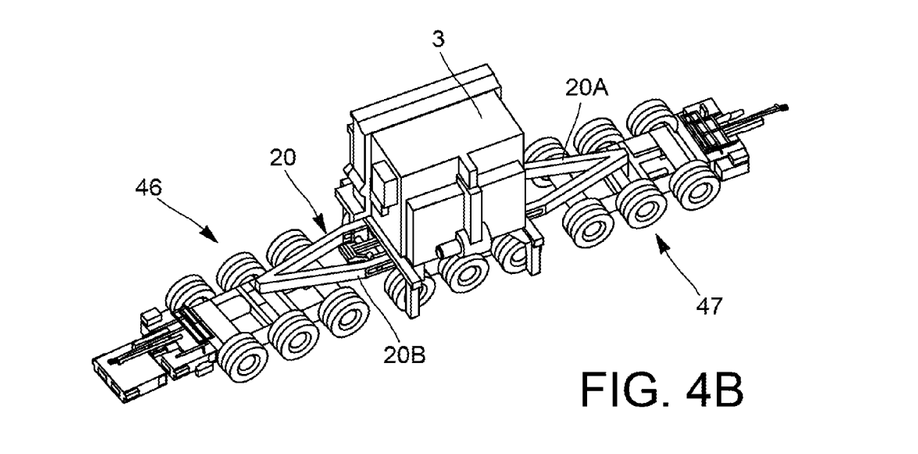

FIG. 4B shows, in a cavalier view, this same embodiment. It can be noticed that the loading platform 20 can be formed by two siderails 20A and 20B joining at their ends, where the loading platform 20 is in contact with each of the end modules 46 and 47, through the support hinge 24.

Figure 4C:
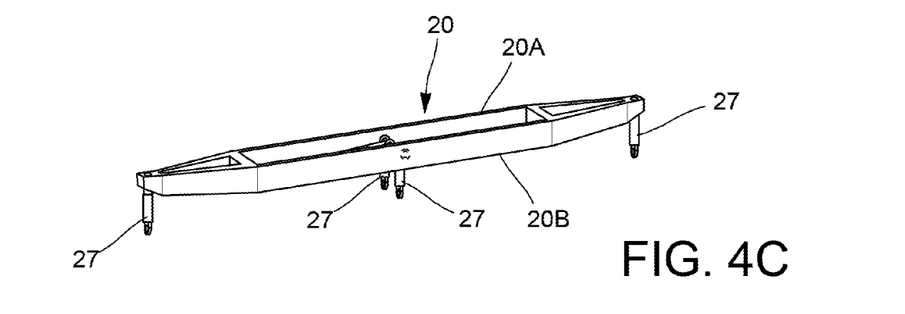

FIG. 4C shows, in a cavalier view, this structure characterising the loading platform 20, with its two siderails 20A and 20B joined at their ends. The previously mentioned support hinge 24 is made, in this example, by means of a jack 27 hingedly mounted both on the loading platform 20 and on the frame of the corresponding end module. Similarly, the limitation to a vertical movement of the support assembly 21 of FIG. 4A is made by means of two jacks 27. On the other hand, the movement of these two jacks 27 is limited by the assembly with both seals 22 and the transverse axis 23. In this way, the loading platform 20 is thus roll-controlled. These four jacks 27 enable, among other things, the raising and lifting of the loading platform 20 enabling the hood to be transported to be grasped and removed. Moreover, thanks to both jacks 27 of the central module, the loading platform is roll-limited.

It is noted that, with this technology of jacks 27, no wheeled module has suspension, the axles being rigidly fastened to the structure, that is the frames of these wheeled modules.

The use of jacks 27, at the end modules, enables the distribution of the load to be balanced, when the wheeled vehicle experiences breaks of slope on the track on which it travels.

These jacks 27, placed at the end modules, also enable the turns to be tackled. Indeed, the loading platform 20 being longitudinally fastened on the central wheeled module, the ends thereof are longitudinally off-centred relative to the end wheeled modules. In this case, the length of the jacks 27 extends. Finally, the four jacks 27 provide for the installation and removal of the hood 3.

Figure 5:
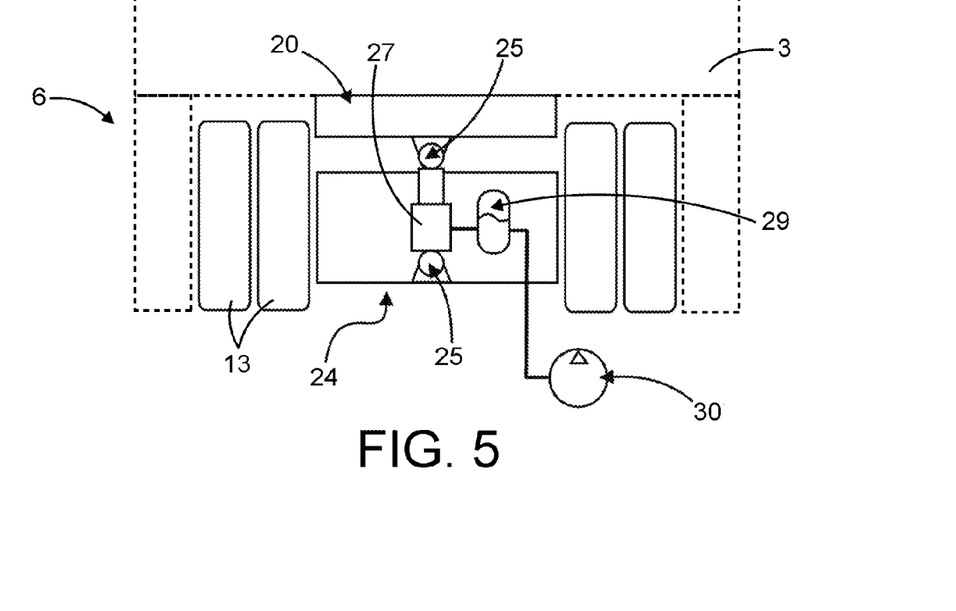
FIG. 5, a front diagram of a device for fastening an end wheeled module of the third embodiment of the wheeled vehicle according to the invention.

FIG. 5 shows, in another way, the support hinge 24 of the end modules 46 and 47 and especially the length of the jack 27. The latter is supplied with pressure by an accumulator 29, which can be held in pressure by a hydraulic power pack 30, installed aboard the vehicle. Displacements being low, the quantities of involved hydraulic fluids are limited.

In this embodiment where the support hinges 24, between the loading platform 20 and the end wheeled modules 46 and 47, are provided by hydraulic, pneumatic or electric jacks, for the support assembly 21 of the central wheeled module, the capacity of vertical displacement enabling the hood to be raised and removed is also provided with two jacks 27.

Figure 6:
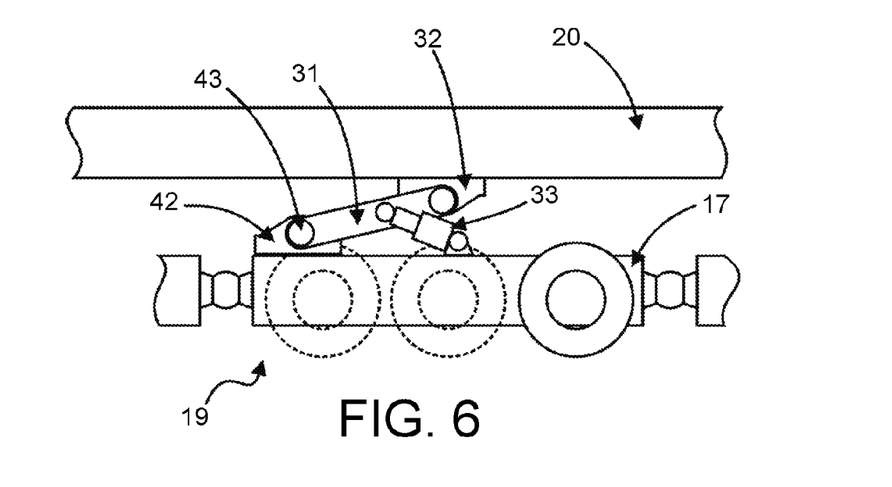
FIG. 6, in a side view, a device for fastening the central module of the third embodiment of the wheeled vehicle according to the invention.

FIG. 6 shows a particular embodiment of the support assembly 21 of the central wheeled module. It consists in interposing a rock lever 31 between two side seals 42, fastened to the frame 17 of the central wheeled module 19. The loading platform 20 must also be fitted with an articulated connection 32, similar to the assembly formed by the seals 22 and the transverse axis 23 of the embodiment described with respect to FIG. 4A. The rock lever 31 is rotatably actuated around transverse axes 43 by a jack 33 which is similar in its operation to the previously used jack 27. The advantage of this embodiment of the support assembly 21 is to control the vertical displacement of the loading platform 20, while providing a robust maintenance of these movements in the longitudinal and transverse directions.

In all these embodiments, the load support occurs between the wheels of the axles and not above. Consequently, in the low position, the minimum height H2 of the wheeled vehicle can be virtually equal to the diameter D of the wheels which is just lower than the height H1 of the legs 5 of the hood 3. On the other hand, in a high position, the elements supporting the hood 3 rise above this height 1 of the legs 5 of the hood 3.

Figure 7:
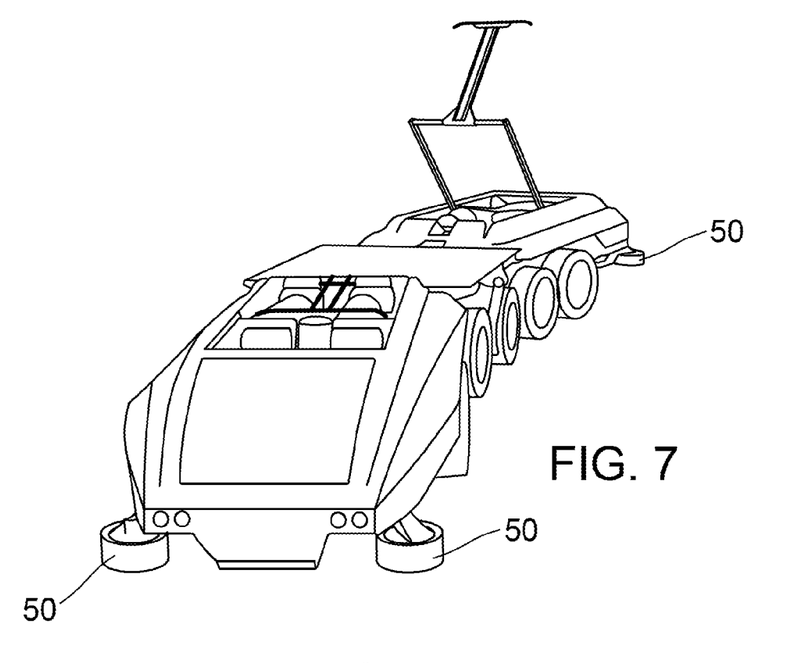
FIG. 7, in a cavalier perspective, the vehicle according to the third embodiment going down a slope and being fitted with guiding means.

With reference to FIG. 7, the vehicle can be advantageously fitted with guiding means laterally placed at the front and rear, at the lower part of the vehicle. They are here formed by horizontal wheels 50 freely rotating around vertical axes and shifted towards the outside of the vehicle relative to the wheels of the latter, so as to be able to rest on a lower vertical wall of the gallery to provide the guiding of the end modules. The vehicle was here represented as going down a gallery road the slope of which can be of fifteen percent (15%), thanks, among other things, to the fact that the height of the convoy is minimized by the low height of the vehicle. Moreover, this embodiment shows the absence of a cabin which proves that this vehicle can be remote-controlled.

Figure 8:
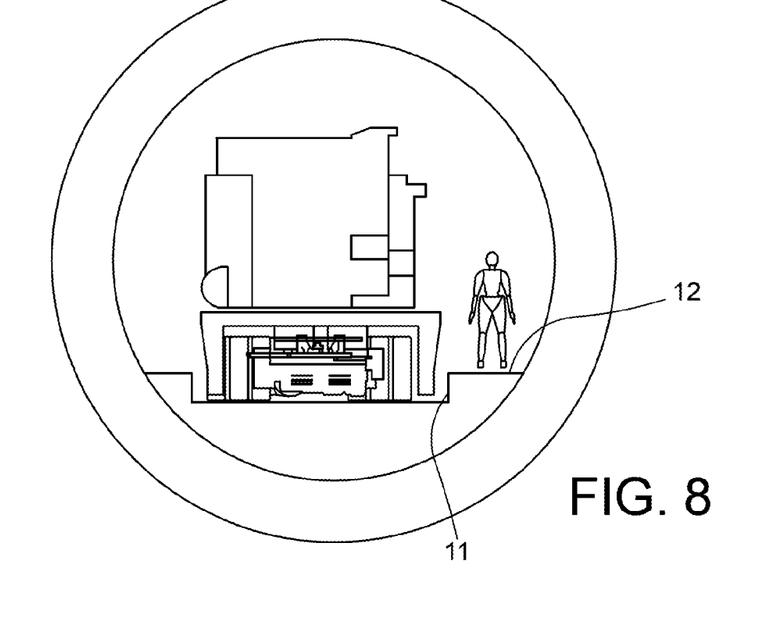
FIG. 8, in a cross-section view, a gallery taken by a vehicle according to the invention.

Finally, FIG. 8 shows in a cross-section a gallery taken by the vehicle according to the invention. In this example, the gallery has a pavement 12 on the side of which is the lower part 11 on which the guiding means 50 represented in FIG. 7 can rest. The diameter of this circular gallery is in the order of seven meters, the cross-section of the gallery is thus minimized, thanks to the compactness of the vehicle.

ADVANTAGES OF THE INVENTION

A vehicle can load a hood by its own means by driving under the hood between the legs of the hood, and then by raising its platform to get the hood off the ground and carry it. Unloading the hood is made in the same way, but in reverse order.

A vehicle being articulated, its running within curves of the galleries is improved and it becomes possible to place a large number of accessories into great front and rear overhangs. This transfer of volumes occupied by the accessories in front or rear overhang of the vehicle enables the latter to completely pass under the hood, therefore to be able to be removed in both directions after installing the hood. The resulting advantage is thus to create volumes which crush in a case of a collision and absorb energy.

The vehicle being formed by at least two modules, the hinge between these modules must enable the distribution of the load between the modules.

The vehicle being articulated, it fits into the turns while keeping a quite constant distance relative to the walls: this quality enables the width of the galleries to be reduced, and also enables a mechanical guiding resting on the walls to be provided, for example by lateral support rollers on the walls which have a substantially vertical rotational axis.

The design of this vehicle enables it to function reversibly up/down and to go at 10 km/hours over 5 to 20 kilometers.

It can be used on very steep slopes.

It can be remote-controlled, that is without a pilot aboard.

It meets the Basic Safety Regulations applied to the underground nuclear plants.

The use of guiding means enables a redundancy of the guiding system.

The very low height of the vehicle enables the height of the galleries to be minimized.

Finally, it can be easily repaired by other road vehicles.

What is claimed is:

1. A wheeled vehicle for transferring heavy loads, which are mounted on legs at a determined height H1, the wheeled vehicle including:
   means for raising the heavy load; and
   two distinct wheeled modules, wherein
   the two wheeled modules are directly articulated to each other;
   the two wheeled modules each have at least three wheel axles the diameter D of which is slightly lower than the determined height H1 of the legs of the heavy load;
   the wheeled vehicle has a minimum height H2 lower than the determined height H1 of the legs of the load, to be able to pass under said load; and
   the two wheeled modules are each fitted with a fastening device having a degree of rotational freedom around a vertical axis, one of both fastening devices having a degree of longitudinal translational freedom, both fastening devices having jacks forming raising means.

2. The wheeled vehicle according to claim 1, having:
   a hinge relative to the vertical axis, between the two wheeled modules; and
   the wheels of the axle, placed closest to the hinge, being without steering, the wheels of the other axles being steeringly articulated.

3. A wheeled vehicle for transferring heavy loads, which are mounted on legs at a determined height H1, the wheeled vehicle including:
   means for raising the heavy load; and
   three wheeled modules comprising a central module and two end modules, wherein
   the three wheeled modules are directly articulated to each other;
   the three wheeled modules each have at least three wheel axles the diameter D of which is slightly lower than the determined height H1 of the legs of a heavy load;
   the wheeled vehicle has a minimum height H2 lower than the determined height H1 of the legs of the load, to be able to pass under said load;
   the central wheeled module has four fasteners, which receive and block said load longitudinally and transversely, and includes jack-forming raising means; and
   two hinges connect the central wheeled module to each of both end wheeled modules, the hinge having only one degree of rotational freedom relative to the vertical axis, enabling part of the load weight to be transmitted to the end wheeled modules.

4. A wheeled vehicle for transferring heavy loads, which are mounted on legs at a determined height H1, the wheeled vehicle including:
   means for raising the heavy load; and
   three wheeled modules comprising a central wheeled module and two end wheeled modules, wherein
   the three wheeled modules are directly articulated to each other;
   the three wheeled modules each have at least three wheel axles the diameter D of which is slightly lower than the determined height H1 of the legs of a heavy load;
   the wheeled vehicle has a minimum height H2 lower than the determined height H1 of the legs of the load, to be able to pass under said load;
   a loading platform is provided to receive the heavy load and rest on the three wheeled modules;
   the central wheeled module includes a support assembly to support the loading platform, allowing a transverse rotation while blocking the loading platform against roll and yaw; and
   both end wheeled modules each have a support hinge to support the loading platform formed by a jack, connected to the loading platform and to a frame of the end wheeled module, these two support hinges being vertically translationally adjustable.

5. The wheeled vehicle according to claim 3, wherein:
   the central wheeled module has three axles of non-steering wheels; and
   both end wheeled modules have three axles, the two farthest of which from the hinge are steering wheels, the axle placed closest to the hinge having non-steering wheels.

6. The wheeled vehicle according to claim 4, wherein:
   the central wheeled module has three axles of non-steering wheels; and
   both end wheeled modules have three axles, the two farthest of which from the hinge are steering wheels, the axle placed closest to the hinge having non-steering wheels.

7. The wheeled vehicle according to claim 2, wherein the axles with non-steering wheels are dual wheels.

8. The wheeled vehicle according to claim 3, wherein the axles with non-steering wheels are dual wheels.

9. The wheeled vehicle according to claim 5, wherein the axles with non-steering wheels are dual wheels.

10. The vehicle according to claim 4, wherein the support assembly has two oleopneumatic jacks, forming raising means.

11. The wheeled vehicle according to claim 4, wherein the raising means are formed by jacks for the end wheeled modules completed by a pressure accumulator, supplied by a hydraulic power pack.

12. The wheeled vehicle according to claim 4, wherein the support assembly of the central wheeled module is mounted on two rock levers, itself mounted articulated on the frame of the central wheeled module and actuated by a jack, itself mounted articulated on the frame, the assembly thus forming the raising means.

13. The vehicle according to claim 1, wherein lateral guiding means are used in the form of horizontal wheels laterally placed at the ends and at the bottom part of the vehicle, to contact a bottom part of a gallery in which the vehicle travels.

* * * * *